H. G. WALLACE.
FLY WHEEL ATTACHMENT.
APPLICATION FILED MAR. 9, 1917.

1,303,428.

Patented May 13, 1919.

Witness
J. R. Ineis
R. L. Parker

Inventor
H. G. Wallace
By C. A. Snow & Co.
Attorney

UNITED STATES PATENT OFFICE.

HARRY G. WALLACE, OF SAG HARBOR, NEW YORK.

FLY-WHEEL ATTACHMENT.

1,303,428.

Specification of Letters Patent.　　Patented May 13, 1919.

Application filed March 9, 1917.　Serial No. 153,632.

*To all whom it may concern:*

Be it known that I, HARRY G. WALLACE, a citizen of the United States, residing at Sag Harbor, in the county of Suffolk and State of New York, have invented a new and useful Fly-Wheel Attachment, of which the following is a specification.

The device forming the subject matter of this application is a fly wheel attachment, and the invention aims to provide novel means whereby a wheel of any desired sort may be attached to a tapered shaft and be removed from the tapered portion of the shaft readily by a manipulation of the means which secures the wheel to the shaft.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the drawings:—

Figure 1:
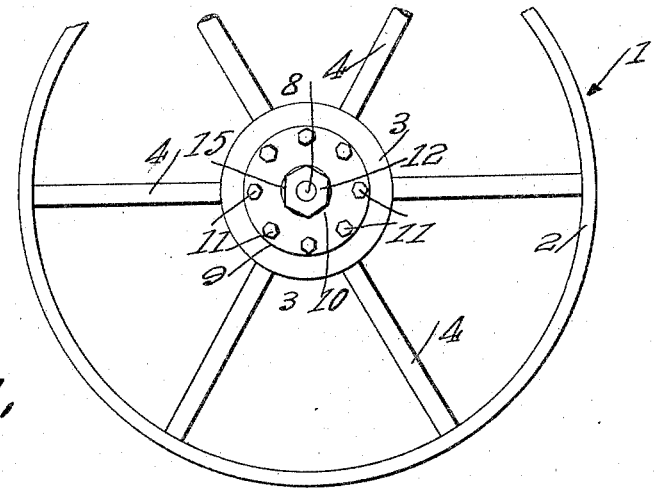
Figure 1 shows in front elevation, a portion of a wheel whereunto the structure forming the subject matter of this application has been applied.
Figure 2:
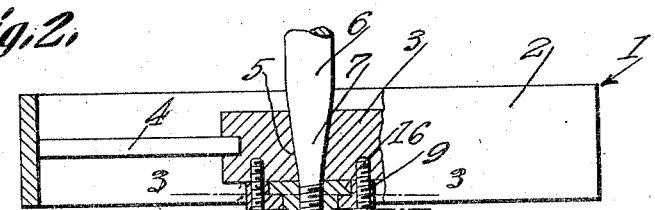
Fig. 2 is a transverse section of the structure shown in Fig. 1, parts appearing in elevation.
Figure 3:
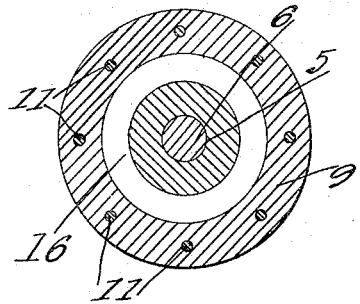
Fig. 3 is a section on the line 3—3 of Fig. 2.
Figure 4:
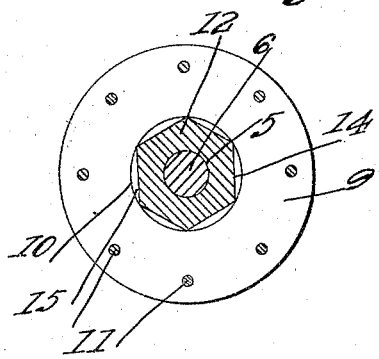
Fig. 4 is a section on the line 4—4 of Fig. 2.

The numeral 1 denotes a fly wheel including a rim 2, a hub 3 and spokes 4 connecting the hub 3 with the rim 2. The hub 3 has a tapered bore 5. The numeral 6 denotes a shaft having a tapered part 7 received in the tapered bore 5, the part 7 of the shaft terminating in a cylindrical threaded tip 8.

The numeral 9 denotes a collar which may be secured in any desired way to one end of the hub 3. The collar 9 has an inwardly projecting flange 10. In the present instance, the collar 9 is held to the end of the hub 3 by means of attaching elements 11.

The numeral 12 designates generally, a nut, including an outer wrench head 14, a cylindrical part 15, and an inner annular flange 16.

In practical operation, the nut 12 is threaded onto the tip 8 of the shaft and, bearing against the hub 3, seats the hub on the tapered part 7 of the shaft. Subsequently, the collar 9 is mounted in place and is held to the hub 3 by means of the attaching elements 11 or otherwise. The flange 10 of the collar 9 overhangs the rear flange 16 of the nut 12. A wrench may be applied to the head 14 of the nut, and when the nut is unscrewed, the nut will rotate within contour of the collar 9 and, coöperating with the tip 8 of the shaft will operate to pull the wheel 1 away from the shaft.

Having thus described the invention, is claimed is:—

In a device of the class described, a including a hub having a flat and plain face, the hub being provided with a tapered bore; a shaft comprising a cylindrical tapered part; a nut threaded on the same diameter as the smaller end of the shaft and comprising the flat end of the shaft and comprising a cylindrical part, and a wrench flange abutting against the flat end hub, a cylindrical part, and a wrench projecting from the cylindrical part of the hub, comprising a thickened body recess and provided with a flange of the nut; and sliding the flange of the body of the collar vices connecting the body of the collar the hub, the body of the nut, a table on the flange of the nut, rotatable of the collar being rotatable drical part of the nut, for a permit the insertion of the set into the hub.

In testimony that I claim as my own, I have hereto affixed my signature in the presence of two

HARRY G

Witnesses:
　MALTBY C. BEEBE,
　JOHN M. WOODWARD